April 19, 1955     I. M. LOGAN ET AL     2,706,382
DEVICES FOR CONFINEMENT AND RELEASE
OF HIGH VELOCITY, HOT GASES
Filed July 9, 1949
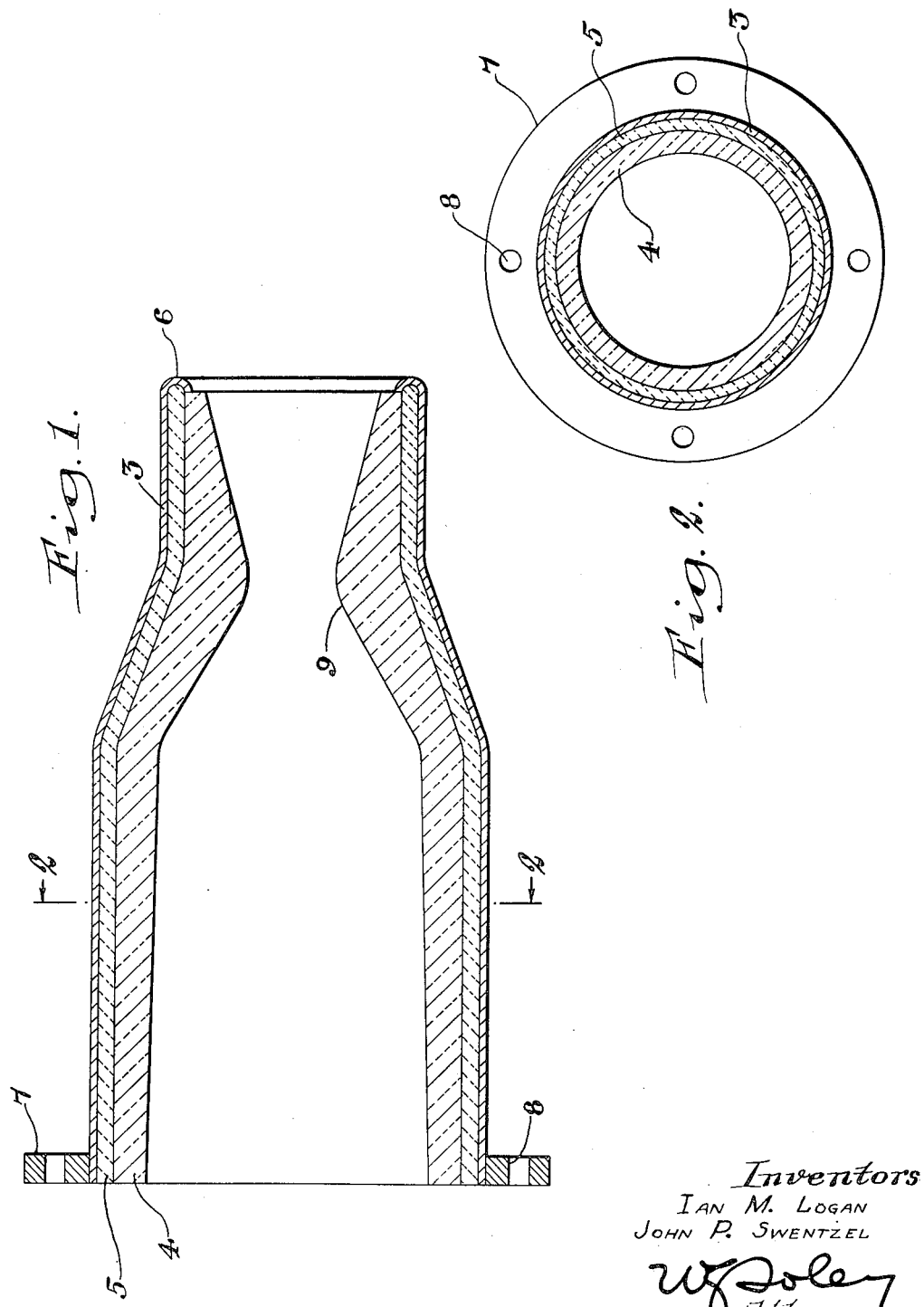
Inventors
IAN M. LOGAN
JOHN P. SWENTZEL
Attorneys

United States Patent Office

2,706,382
Patented Apr. 19, 1955

2,706,382

DEVICES FOR CONFINEMENT AND RELEASE OF HIGH VELOCITY, HOT GASES

Ian M. Logan, Lewiston, and John P. Swentzel, Niagara Falls, N. Y., assignors to The Carborundum Company, Niagara Falls, N. Y., a corporation of Delaware Application July 9, 1949, Serial No. 103,876

4 Claims. (Cl. 60—35.6)

This invention relates to devices adapted for the control and directional release of high velocity, hot gases such as, for example, combustion chambers and/or nozzles of rocket motors, jet propulsion engines, and the like. The invention is particularly concerned with the materials of fabrication in such devices wherein they are rendered capable of far more extended periods of use before breakdown or failure.

Heretofore, the manufacture of such devices utilizing a ceramic material has been unsatisfactory since no material capable of standing up under the high velocity, hot gases evolved in the operation of rocket and jet propulsion motors, thermal jet engines and the like has been found. Such devices have therefore required the utilization of intricate and costly air or liquid-cooling systems in order to keep the temperature down to a point where the use of the equipment was in any way feasible. Even with the best of such cooling systems rocket motor nozzles, combustion chamber linings and devices of like nature have had an inordinately short life.

It is an object of the present invention to provide a new and improved ceramic lined rocket motor adapted for the control and directional release of high velocity, hot gases which will eliminate the need for intricate and costly cooling means.

It is a further object to provide such devices which are more simple in design and inexpensive to make and which will have useful lives comparable to the life offered by devices embodying external cooling systems.

Other advantages and benefits accruing from the present invention will become apparent as the description proceeds.

Referring to the drawing, which is presented for illustrative purposes only,

Figure 1 is a diametrical lengthwise section view of a rocket motor made in accordance with and embodying the present invention; and Figure 2 is a cross-sectional view through the line 2—2 of Figure 1.

In accordance with the present invention rocket motors, jet propulsion motor combustion chambers and nozzles, thermal jet engines and other devices adapted for the control and directional release of high velocity, hot gases are made with a strong metallic retaining shell such as steel provided with a ceramic lining which is highly resistant to breakdown under the conditions of use to which such devices are exposed. The ceramic linings embodied in the devices in the present invention are silicon nitride bonded bodies made by forming a lining element of the desired shape from finely divided silicon metal with or without the inclusion therewith of a hard granular refractory material such as silicon carbide or a hard granular refractory oxidic material and firing the shaped article in an atmosphere of nitrogen or other non-oxidizing, nitrogenous atmosphere at a temperature sufficient to convert the silicon to silicon nitride. The resulting ceramic body where silicon metal alone is used becomes essentially a self-bonded silicon nitride body wherein the silicon nitride constitutes both the refractory ingredient of the body as well as the bond. When added granular refractory material, such as silicon carbide or a refractory oxide or oxides, is incorporated in the mix the resulting body is one in which the granular refractory material is bonded by the silicon nitride formed during the firing of the body. Therefore, in all cases the resulting ceramic body is a silicon nitride-bonded composition. The ceramic body which serves as the lining element of the devices of the present invention is seated in its retaining shell to which it is shaped to generally conform and is usually held securely in place therein by means of an intermediate layer of refractory cement which is preferably of an insulating character. A suitable cement for the purpose is one composed as follows:

55% by weight 40 to 70 mesh electrically fused $Al_2O_3$
15% by weight $Al_2O_3$ powder—not electrically fused
6% by weight kaolin
24% by weight sodium silicate ("O" grade as sold by the Philadelphia Quartz Co.)

The drawing, which is for illustrative purposes only and is not to be considered as limiting the invention, depicts a typical rocket motor made in accordance with the present invention and consists of a steel retaining shell 3 and nitride-bonded ceramic lining 4 which is seated in the retaining shell and held in place by an intervening layer 5 of a refractory insulating cement. The ceramic lining 4 is further prevented from displacement by the inwardly turned end portion 6 of the steel shell 3. The steel shell is provided with a mounting flange 7 provided with bolt holes 8 by which it is fastened to the fuel injection head with which it is used. The ceramic lining is provided with a restricted throat portion 9 through which the hot gases of combustion move at a high velocity. The silicon nitride bonded ceramic lining 4 may be any one of a number of different compositions, all in accordance with the teachings herein, including the various specific examples given below, without departing from the present invention, the essential feature being, however, that the lining be a material which is bonded by silicon nitride. As already pointed out, that material may be silicon nitride alone or with some other added refractory substance.

In order that the invention may be more fully understood, the following specific examples are submitted for illustrative purposes and indicate the type of silicon nitride-bonded compositions which can be utilized as the lining material in the devices made in accordance with the practices and principles of the present invention.

*Example I*

A ceramic lining suitable for use in a rocket motor head such as that shown in Figures 1 and 2 of the drawing and composed substantially entirely of self-bonded silicon nitride has been made as follows:

Commercial grade silicon metal of 200 mesh size and finer is mixed with 1½% dextrin as a temporary binder, moistened with water to bring the mixture to tamping consistency, and the resulting mixture hand-tamped in a mold with a suitable tamping tool to the desired shape. The tamping operation is carried out in conventional manner with the mold filled in increments and tamped progressively from one end to the other as the mold is progressively filled with material.

The silicon by analysis contains, in addition to silicon, the following impurities:

|  | Percent |
|---|---|
| Iron | 0.87 |
| Chromium | 0.21 |
| Aluminum | 0.60 |
| Calcium | 0.54 |

The formed article is dried and placed in a muffle furnace and the normal atmosphere in the muffle replaced by a continuous stream of dry commercial grade nitrogen (having a purity of 99.7% nitrogen), after which the temperature of the furnace chamber is gradually raised to 1400° C. over a period of several hours and held at that temperature for 7 hours during all of which time a continuous stream of nitrogen is fed into the furnace muffle. The furnace is cooled, while the nitrogen atmosphere is maintained in the muffle, and the finished shape, composed substantially entirely of silicon nitride, is removed for installation in the metal retaining shell. The resulting shape, which is dark grey in color, dense and mechanically strong, resembles a ceramic body which has been bonded by a sintering of the particles. When tested for hardness a body of the above composition usually has a Rockwell hardness, Scale B, of around 30.

Example II

A ceramic lining element, suitable for use in the specific device of Figures 1 and 2 of the drawing; and composed of silicon nitride-bonded silicon carbide has been made from the following composition:

| | Parts by weight |
|---|---|
| 14–36 mesh size silicon carbide grain | 48 |
| 80 and finer silicon carbide grain | 36 |
| 200 mesh size and finer silicon powder | 16 |
| Dry lignone (dried residue from concentration of cellulose sulfite liquor) | 5 |
| Bentonite gel | 6 |

The above ingredients, with the exception of the bentonite gel, are dry mixed in a tumbling barrel for 15 minutes to insure good blending, after which they are wet mixed for an additional 20 minutes in a kneader mixer. The mix is wet to the proper pressing consistency with the bentonite gel which is composed of 4 parts of water and 1 part dry bentonite powder. The bentonite gel serves to take up the finely divided silicon powder, which is otherwise very fluffy and extremely difficult to handle, and distribute it evenly and uniformly throughout the molding mixture and provide a well blended batch of suitable consistency for molding.

The shape is formed by pressing in a hydraulic press at a pressure in excess of 5000 pounds per square inch. The dried article is then placed in a muffle furnace and the normal atmosphere in the muffle replaced by a continuous stream of dry commercial grade nitrogen having a purity of 99.7%, after which the temperature of the furnace chamber is gradually raised over a period of several hours to 1400° C. and held at that temperature for 12 hours, while a continuous stream of nitrogen is fed into the furnace muffle. The furnace with the nitrogen still flowing is allowed to cool to room temperature or to a temperature convenient for handling the fired article, whereupon it is removed from the furnace ready for installation in its retaining shell.

Example III

Various shapes suitable for lining devices exposed to high velocity, hot gases such as ordnance rockets, thermal jet engine parts and other shapes, including the particular shaped lining used in the device pictured in the drawing, are made in accordance with the principles and practices of the present invention as follows:

| | Parts by weight |
|---|---|
| 220 grit size silicon carbide | 50 |
| Pulverized silicon metal | 50 |
| Bentonite | 2 |

The pulverized silicon powder is obtained by grinding commercial grade 200 mesh and finer silicon until the major part of the silicon particles has a particle size of 0–20 microns. A typical particle size analysis of silicon powder which has been suitably ground or pulverized is the following:

| | Percent |
|---|---|
| 0–10 microns | 52 |
| 10–20 microns | 18 |
| 20–30 microns | 12 |
| 30–40 microns | 10 |
| 40–90 microns | 8 |

After thorough mixing of the aforementioned ingredients sufficient water is added to render the mix of slip casting consistency. The resulting slip is poured into a plaster of Paris mold in accordance with standard slip casting procedure to form a lining element of the desired shape. The slip cast article is removed from the mold and dried after which it is placed in the muffle of a furnace in which the normal atmosphere in the muffle has been replaced by dry nitrogen gas. The temperature of the furnace chamber is gradually raised over a period of several hours to 1400° C. and held at that temperature for seven hours while a constant flow of nitrogen into the furnace muffle is maintained. The furnace is allowed to cool while the atmosphere of nitrogen is maintained, whereupon the article is removed from the furnace ready for use.

Example IV

Various shapes suitable for lining devices exposed to high velocity, hot gases such as rocket motors for jet-assisted take-off units and other shapes, including the particular shaped lining element embodied in the device pictured in the drawing, are made in accordance with the principles and practices of the present invention as follows:

| | Parts by weight |
|---|---|
| 150 and finer fused aluminum oxide | 50 |
| 200 and finer commercial grade silicon metal | 50 |
| Dextrin | 1 |

The above materials are thoroughly mixed and moistened with water to form a mix having a consistency suitable for pressure molding. Lining elements of the desired size and shape are then formed by placing the moistened material in a steel mold and pressing at a pressure of 1500 pounds per square inch. The resulting molded elements are then dried and placed in a muffle furnace and the normal atmosphere in the muffle replaced by a non-oxidizing atmosphere of nitrogen and fired in a constant stream of nitrogen for several hours at a temperature of 1300° C. to 1400° C. The furnace is then allowed to cool while the flow of nitrogen is continued. When cool enough to handle, the articles are removed from the muffle and are ready for mounting in suitable metal retaining shells or otherwise installed for use.

Although dry nitrogen gas having a purity of 99.7% has been mentioned for use in the example set forth above, similar results can be obtained with the use of other non-oxidizing atmospheres containing nitrogen, for example, commercial annealing hydrogen which has an approximate analysis of 93% nitrogen and 7% hydrogen or ammonia gas can be satisfactorily used in place of nitrogen.

While we have specified the use of silicon metal in finely divided form as the source of the silicon which is converted to silicon nitride during the firing operation to bond itself or the added refractory material of the lining element of the devices made in accordance with the present invention, it is possible to use as a source of silicon for the formation of the silicon nitride bond, without departing from the spirit or scope of the present invention, certain alloys of silicon such as ferrosilicon alloys or ferromanganese silicon alloys in similarly finely divided form as a source of the silicon for the silicon nitride bond.

Having described the invention in detail, it is desired to claim:

1. A rocket motor comprising an external cylindrical metal shell and a refractory lining therein insulated from said shell by an intermediate layer of refractory insulating material, said lining being inwardly tapered to a greater thickness at the exit end of said shell to form a restricted throat area, said refractory lining comprising a silicon nitride-bonded body.

2. A rocket motor comprising an external cylindrical metal shell and a refractory lining therein insulated from said shell by an intermediate layer of refractory insulating material, said lining being inwardly tapered at the exit end of said shell to form a restricted throat area, said refractory lining comprising a silicon nitride-bonded body.

3. A rocket motor comprising an external cylindrical metal shell and a refractory lining therein insulated from said shell by an intermediate layer of refractory insulating material, said lining being tapered inwardly from both ends to a point intermediate thereof to form a restricted throat area and an outwardly flared exit cone, said refractory lining comprising a silicon nitride-bonded body.

4. A rocket motor comprising an external cylindrical metal shell and a refractory lining therein insulated from said shell by an intermediate layer of refractory insulating material, said lining being tapered inwardly from both ends to a point intermediate thereof to form a restricted throat area and an outwardly flared exit cone, said refractory lining comprising a silicon nitride-bonded body extending from end to end of said rocket motor.

References Cited in the file of this patent

UNITED STATES PATENTS

| 866,444 | Egly | Sept. 17, 1907 |
| 1,611,353 | Lepinte | Dec. 21, 1926 |
| 1,798,934 | Forse | Mar. 31, 1931 |

(Other references on following page)

UNITED STATES PATENTS

| | | |
|---|---|---|
| 1,879,186 | Goddard | Sept. 27, 1932 |
| 2,217,649 | Goddard | Oct. 8, 1940 |
| 2,330,129 | Lucas | Sept. 21, 1943 |
| 2,431,327 | Geiger | Nov. 25, 1947 |
| 2,447,758 | Lubbock et al. | Aug. 24, 1948 |
| 2,465,672 | Blaha | Mar. 29, 1949 |

FOREIGN PATENTS

| | | |
|---|---|---|
| 26,384 | Great Britain | Dec. 18, 1905 |
| 5,161 | Great Britain | Mar. 1, 1910 |
| 599,275 | Great Britain | Mar. 9, 1948 |
| 578,261 | Great Britain | June 21, 1946 |

(Corresponds to Lubbock 2,447,758)